Patented Feb. 10, 1942

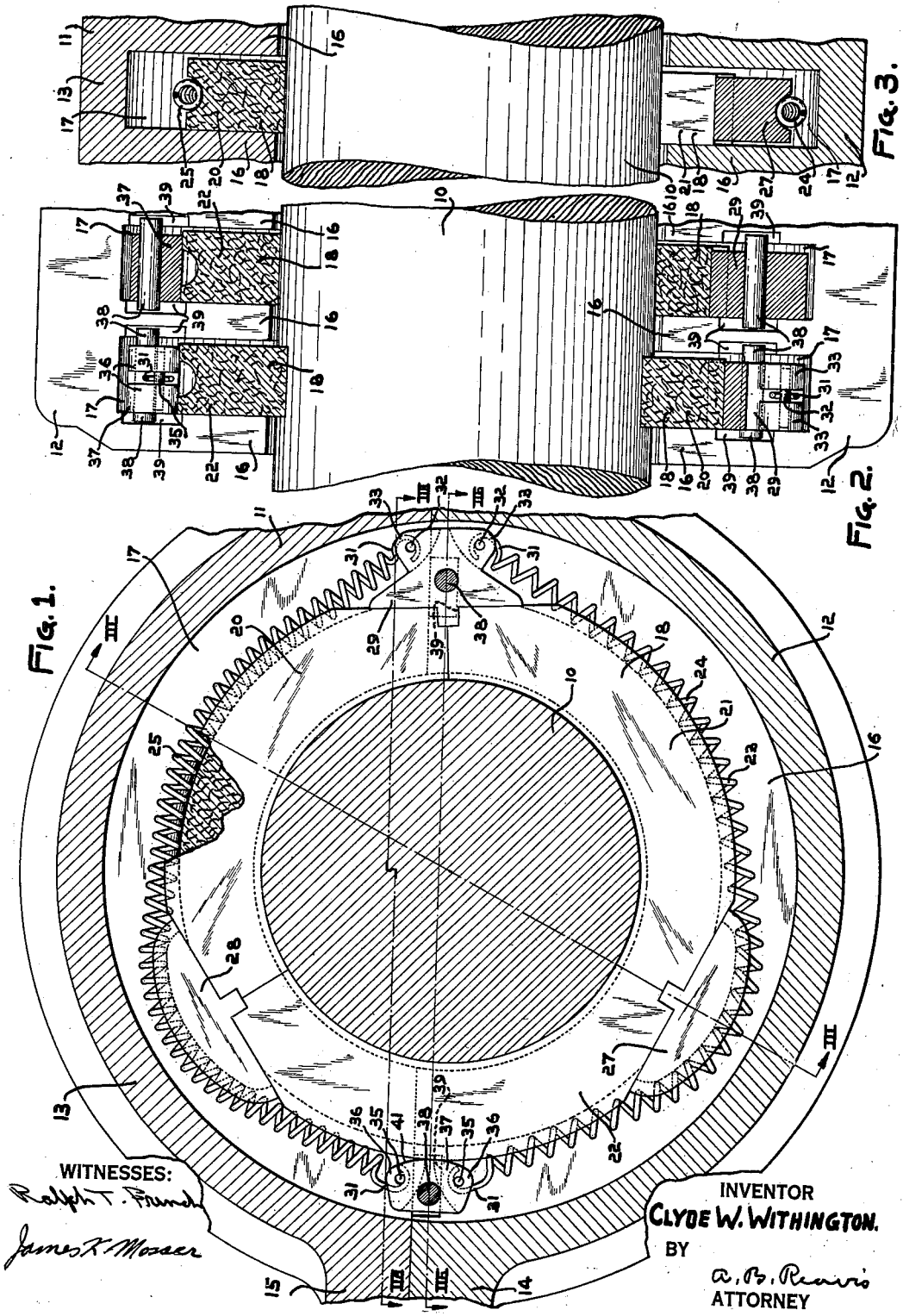

2,272,455

UNITED STATES PATENT OFFICE 2,272,455

CARBON RING

Clyde W. Withington, Media, Pa., assignor to Westinghouse Electric & Manufacturing Company, East Pittsburgh, Pa., a corporation of Pennsylvania Application March 17, 1939, Serial No. 262,503

4 Claims. (Cl. 286—24)

This invention relates to elastic-fluid prime movers and more particularly to shaft seals therefor, and it has for an object the provision of an improved sealing ring arrangement for apparatus of this type.

Another object of the invention is the provision of a sealing ring assembly providing substantially uniform pressure between the ring and shaft throughout the area of their engagement.

Yet another object of the invention is the provision of means for supporting the weight of the sealing ring independently of the shaft it surrounds and seals.

A further object of the invention is the provision of means for supporting a segmental sealing ring in such a manner that it engages with equal pressure the entire circumference of the shaft it is sealing.

Another object of the invention is the provision of a segmental sealing ring and a two-section garter spring therefor, with the tension in the lower section of the spring exceeding that in the upper section by an amount sufficient to offset the gravitational load of the ring.

Yet another object of the invention is the provision of a long support spring with a relatively low scale.

These and other objects are effected by my invention as will be apparent from the following description and claims taken in connection with the accompanying drawing, forming a part of this application, in which:

Fig. 1 is a transverse sectional view of a turbine shaft and its associated sealing structure;

Fig. 2 is a sectional view showing two carbon ring assemblies constructed in accordance with the invention, the left-hand ring being viewed along the line II—A—II—A, Fig. 1, and the right-hand ring being viewed along the line II—B—II—B, Fig. 1; and, Fig. 3 is a sectional view taken along the line III—III of Fig. 1.

In the drawing, the numeral 10 indicates the shaft of a turbine rotor (not shown), the shaft being surrounded, in spaced relation, by the casing 11, which, as usual, is divided slightly above the horizontal centerline of the turbine to provide a base portion 12 and a cover portion 13 having flanges 14 and 15, respectively, for the reception of suitable connecting means (not shown), such as bolts.

The casing 11 is provided with radially-extending partitions 16 dividing the space between the casing and shaft into a plurality of annular recesses 17.

Each of the annular recesses houses a sealing ring 18. Preferably, these rings are of carbon or some similar material, and made in a plurality of segments, such as 20, 21 and 22, held together by a garter spring 23 formed of a lower section 24 and an upper section 25.

The garter spring 23 surrounds the ring 18 and engages with saddles 27, 28 and 29, which have contact with the outer surface of the ring at the joints between the segments thereof, and which serve to maintain the ends of the inner surfaces of the segments in circumferential alignment.

The saddles 27 and 28 are of conventional structure, while the saddle 29 is of a special design for a purpose to be hereinafter explained.

The spring sections 24 and 25 are provided at their ends with hooks 31. The hooks at the right-hand ends of the springs (as viewed in Fig. 1) engage over transversely-extending pins 32 carried by bifurcated ears 33 on the saddle 29.

The opposite ends of the spring sections are hooked over pins 35 carried by bifurcated ears 36 on a retaining member 37.

The retainer 37 and the saddle 29 are provided with transversely-extending pins 38 adapted to rest upon the bottoms of elongated slots or recesses 39 formed in the upper surfaces of the radial walls or partitions 16 in the base portion 12 of the casing.

The spring 23 is so designed that, when assembled, the lower section 24 is under greater tension than the upper section 25, the springs being so adjusted that the tension in the lower section exceeds that in the upper section by an amount sufficient to offset the gravitational load of the ring assembly.

Inasmuch as the springs are connected to the retainer 37 and saddle 29, and these latter parts are supported by the walls or partitions 16 of the casing, it will be apparent that the ring assembly is supported independently of the shaft 10, which it surrounds and seals. This arrangement prevents the usual wearing at the top of the inner surface of the ring due to the weight thereof being carried by the shaft.

As an example of the variance in spring tension; with a 4 inch diameter shaft, the carbon ring assembly will have a weight of approximately 1¼ pounds. The upper spring section 25 has a load of approximately 1½ pounds for the purpose of urging the ring sections toward the shaft, and the lower spring section 24 is given an added load or tension of about 1¾ pounds, making a total of 3¼ pounds. Of this extra load, 1¼ pounds is for the actual weight of the ring assembly, and the remaining half-pound is provided to allow for the angular lift of the spring.

Preferably, the retainer 37 is provided with an inner rounded surface 41 permitting it to easily shift circumferentially of the carbon ring, thereby allowing the spring to readjust its position with respect to the ring and saddles in the event of any radial movement of the shaft. Furthermore, the spring 23 is provided with as low a scale as possible so that if the shaft or ring casing shifts in respect to the correct neutral setting, only a small percentage of the weight supported by the spring will be lost.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claims.

What I claim is:

1. In a prime mover, a horizontal shaft, a casing surrounding a portion of said shaft in spaced relation thereto, a sectional sealing ring positioned in the space between the casing and shaft and closely embracing the latter, and means to counterbalance the weight of the sealing ring to provide uniform pressure between the ring and shaft throughout the area of their engagement, said means being comprised by a two-section garter spring having the ends of said sections connected and anchored to the casing adjacent the horizontal plane of the shaft axis, said sections having normal lengths such that the tension in the lower section exceeds that in the upper section by an amount sufficient to offset the gravitational force of the ring.

2. In a prime mover, a horizontal shaft; a casing surrounding a portion of said shaft in spaced relation thereto; a sectional, floating, carbon ring positioned in the space between the casing and shaft and closely embracing the latter; and means providing substantially uniform pressure between the ring and shaft throughout the area of their engagement, said means comprising a two-section garter spring encircling the ring, means securing the ends of the spring sections to the casing at points adjacent the horizontal plane of the shaft axis, and the spring sections being so adjusted that the tension in the lower section exceeds that in the upper section by an amount sufficient to offset the gravitational force of the carbon ring.

3. In a prime mover, a horizontal shaft; a casing surrounding a portion of said shaft in spaced relation thereto; a sectional, floating, carbon ring positioned in the space between the casing and shaft and closely embracing the latter; a two-section garter spring encircling the ring; and members carried by the casing adjacent the horizontal plane of the shaft axis and connecting adjacent ends of the spring sections, said spring sections having normal lengths such that the tension in the lower section exceeds that in the upper section by an amount sufficient to offset the gravitational force of the ring whereby substantially uniform pressure between the ring and shaft throughout the area of their engagement is obtained.

4. In a prime mover, a horizontal shaft; a casing comprised of two or more parts having meeting surfaces defining a joint adjacent the horizontal plane of the shaft axis, the lower of said meeting surfaces having a pair of opposed recesses therein, and said casing surrounding a portion of the shaft in spaced relation thereto; a segmental, floating, carbon ring positioned in the space between the casing and shaft and closely embracing the latter; saddle members at the joints of the ring segments for maintaining circumferential alignment of the inner surfaces thereof; a two-section garter spring encircling the ring and saddles; an axially-extending lug carried by one of the saddles and disposed in one of the recesses at the casing joint; a retaining member positioned diametrically opposite the last-mentioned saddle; an axially extending lug carried by said retaining member and disposed in the other of said recesses at the casing joint; said one saddle and said retaining member serving to connect adjacent ends of the spring sections, said sections being of such lengths that the tension in the lower section exceeds that in the upper section by an amount sufficient to offset the gravitational force of the ring in order to obtain substantially uniform pressure between the ring and shaft throughout the area of their engagement.

CLYDE W. WITHINGTON.